US010015096B1

(12) United States Patent
Singh

(10) Patent No.: US 10,015,096 B1
(45) Date of Patent: Jul. 3, 2018

(54) CONGESTION AVOIDANCE IN MULTIPATH ROUTED FLOWS

(71) Applicant: Amazon Technologies, Inc., Seattle, WA (US)

(72) Inventor: Bijendra Singh, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 34 days.

(21) Appl. No.: 15/187,486

(22) Filed: Jun. 20, 2016

(51) Int. Cl.
| | |
|---|---|
| *H04L 1/00* | (2006.01) |
| *H04L 12/801* | (2013.01) |
| *H04L 12/707* | (2013.01) |
| *H04L 12/935* | (2013.01) |
| *H04L 12/741* | (2013.01) |

(52) U.S. Cl.
CPC ............ *H04L 47/12* (2013.01); *H04L 45/24* (2013.01); *H04L 45/74* (2013.01); *H04L 47/11* (2013.01); *H04L 49/30* (2013.01)

(58) Field of Classification Search
CPC ..... G06F 17/145; H04J 11/00; H04J 13/0048; H04J 2011/0003; H04J 2011/0006; H04J 2011/0009; H04J 2011/0013; H04J 2011/0016; H04J 2011/002; H04L 47/10; H04L 47/12; H04L 47/20; H04L 47/24; H04L 47/32
USPC .......................................... 370/209, 229–235
See application file for complete search history.

(56) References Cited

U.S. PATENT DOCUMENTS

| | | | |
|---|---|---|---|
| 6,173,384 B1 | 1/2001 | Weaver et al. | |
| 6,987,732 B2 | 1/2006 | Gracon et al. | |
| 7,046,687 B1 | 5/2006 | Brown et al. | |
| 8,279,867 B2 * | 10/2012 | Carley | ................. H04L 49/552 370/389 |
| 8,797,877 B1 | 8/2014 | Perla et al. | |
| 9,473,408 B1 | 10/2016 | Kabbani et al. | |
| 2007/0237074 A1 | 10/2007 | Curry | |
| 2009/0234908 A1 | 9/2009 | Reyhner et al. | |
| 2011/0069711 A1 * | 3/2011 | Jha | ...................... H04L 12/4625 370/395.53 |
| 2013/0156036 A1 | 6/2013 | Basso et al. | |

(Continued)

OTHER PUBLICATIONS

U.S. Appl. No. 15/352,442, filed Nov. 15, 2016, Titled: Uniform Route Distribution for a Forwarding Table.

(Continued)

*Primary Examiner* — Dady Chery
(74) *Attorney, Agent, or Firm* — Kilpatrick Townsend & Stockton LLP

(57) ABSTRACT

Techniques are disclosed regarding receiving a plurality of flows of network packets and determining, by processing logic of a device, a hash value for each of the network packets of the flows, wherein the hash value indicates the flow of network packets that a network packet belongs to. Based on the hash value, one of a plurality of interface ports of a multipath group of the device can be selected for output of network packets from two of the flows of network packets. Network packets from the two flows of network packets to be output by the interface port can be stored. Upon determining that a number of packets stored from the one of the two flows of network packets meets a first threshold, one of the two flows of network packets can be identified as a congestion contributing flow.

20 Claims, 14 Drawing Sheets

(56) References Cited

U.S. PATENT DOCUMENTS

2017/0005931 A1 1/2017 Mehta et al.
2017/0346737 A1 11/2017 Previdi

OTHER PUBLICATIONS

U.S. Appl. No. 15/232,727, filed Aug. 9, 2016, Titled: Congestion Avoidance in Multipath Routed Flows Using Virtual Output Queue Statistics.
U.S. Appl. No. 15/234,996, filed Aug. 11, 2016, Titled: Load Balancing for Multipath Group Routed Flows by Re-Routing the Congested Route.
U.S. Appl. No. 15/235,007, filed Aug. 11, 2016, Titled: Load Balancing for Multipath Groups Routed Flows by Re-Associating Routes to Multipath Groups.

* cited by examiner

| 600 | Interface Group 602 | | | | | | |
|---|---|---|---|---|---|---|---|
| | Enable 604 | Triggered 606 | Flow 1 Hit Count 608 | Flow 1 Hash Value 610 | Flow 2 Hit Count 612 | Flow 2 Hash Value 614 | Interface ID 616 | Timer 620 |

CONGESTION AVOIDANCE IN MULTIPATH ROUTED FLOWS

BACKGROUND

Network devices can be used within a network infrastructure to route flows of network data. The flows of network data can be organized into network packets that may include routing information for each packet (such as destination address(es)). As these network packets traverse a network infrastructure, then can be routed by a network device using information parsed from each of the packets themselves to select the next destination device (or next-hop destination) for the respective packet. The packets can thus traverse the network, hopping from one network device to the next until they reach their final destination. However, network devices are generally stateless and may have limited or no information regarding attributes of flows of network data traversing the network or of a configuration of the network infrastructure itself. A network device's routing decisions may be based on attributes of individual packets on a packet-by-packet basis.

BRIEF DESCRIPTION OF THE DRAWINGS

Various embodiments in accordance with the present disclosure will be described with reference to the drawings, in which:

FIG. 6 illustrates a control block for implementing congestion detection and avoidance, according to certain embodiments;

DETAILED DESCRIPTION

Figure 1:
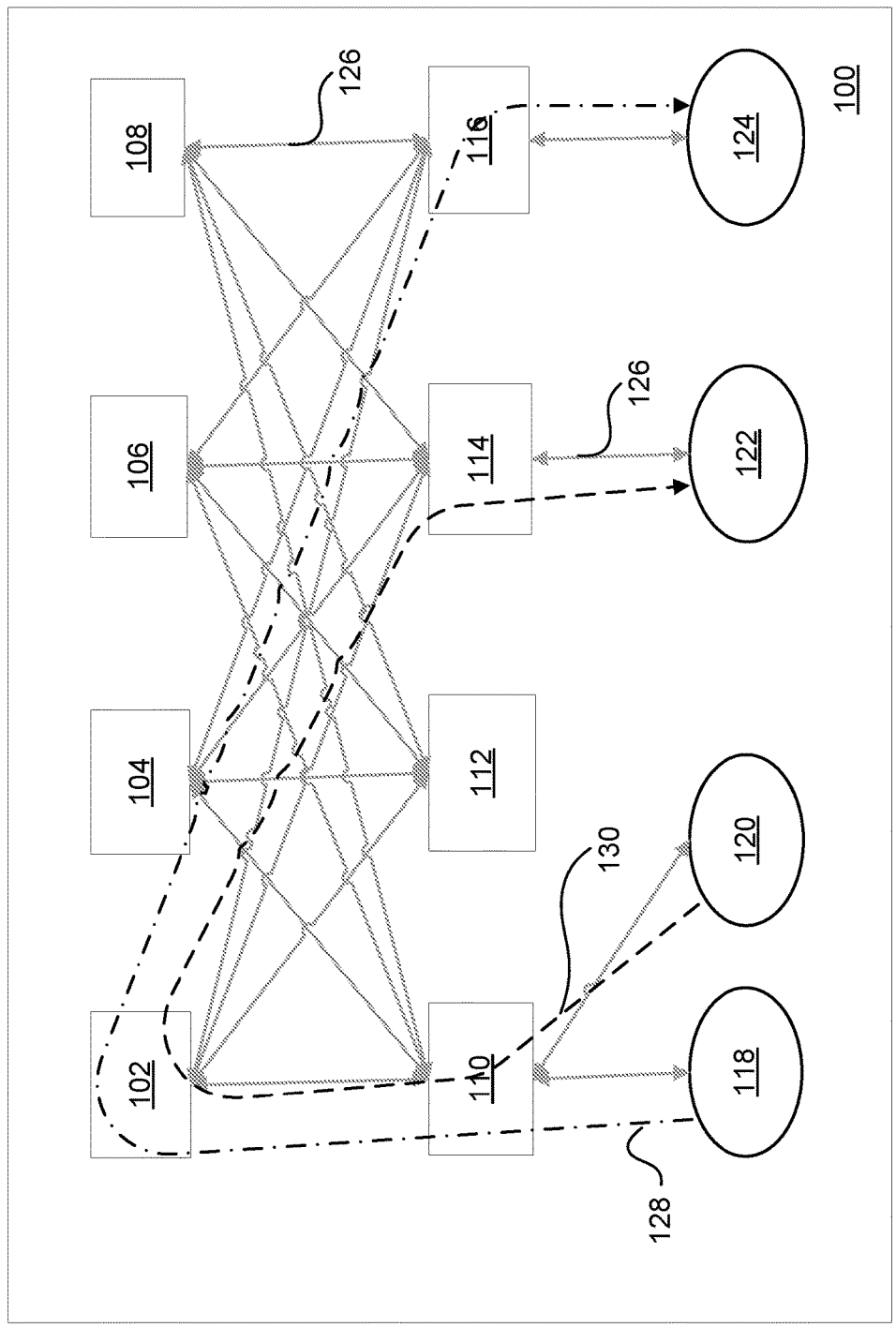
FIG. 1 illustrates a network infrastructure according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Network devices, such as network switches and routers, can be used in a network infrastructure to route network packets through the network infrastructure from a source to an appropriate destination. Each network device can include input and output ports wherein network packets (also referred to as simply packets, herein) are received via an input port and transmitted via an output port. These ports can be limited by physical constraints as to how much data can be transferred for a given time period (e.g., the bandwidth of each port can be limited by physical constraints).

A routing decision as to which output port should be selected for output of a specific network packet received via an input port can be determined by parsing and examining each individual packet. For example, each packet may be encapsulated with information that is used by the network device to determine which output port is appropriate for output of a packet. In such a topology, a network device may have limited information regarding a current state of the network infrastructure or a state of a flow that the network packets may be associated with. For example, the network device may be stateless (i.e., not maintain state information for any given flow of network packets) and route individual packets based on information obtained from each packet on a packet-by-packet basis, but may have no knowledge if packets form a flow of many individual packets, each routed to the same destination from the network device. Flows of network packets can be a series of packets traversing a network from a same source to a same destination. Alternatively, flows of network packets can traverse a network device to a same destination or next hop group. When routing flows of network packets, a network device may generate a hash value to select an outgoing port to route the flow of network packets. The hash value may be the same for all network packets within a flow of network packets.

Therefore, routing decisions to determine the next hop for network packets are substantially based on individual packet information. Network packets from two different flows can be hashed or routed to a singular output port of a network device. If these two data flows going to the same output port contain a relatively high volume of data and consequently a large number of network packets (referred to as elephant flows), the output port may become saturated (e.g., a buffer or queue associated with the output port may overflow, leading to dropped packets). As data centers and cloud computing become increasingly popular, these inefficiencies in network topologies become increasingly apparent.

Disclosed are techniques for identifying elephant flows directed towards the same output interface port of a network device. The techniques can include obtaining statistical information from data packets queued to be output via an output port of the network device. The statistical information can be used to identify queues associated with certain output ports that are saturated, rank flows of network packets routed to the output port, select a flow of network packets significantly contributing to the saturation, and reroute the flow of network packets to an alternate output port. The techniques can enable a network device to adapt in real time to flow conditions of a network infrastructure to identify and react to network data congestion identified at the network device, thus increasing the efficiency of the network infrastructure to transport network packets. The increased efficiency can take the form of better utilization of network resources, leading to increased bandwidth utilization by the network infrastructure.

In certain implementations, the statistical information or state for detecting elephant flows may be maintained and associated with Equal Cost Multi-Path (ECMP) groups, as congestion control blocks. As used herein, a multi-path group is a collection of paths (e.g., interfaces). ECMP groups are a type of multipath group. ECMP groups generally are a grouping of references to output ports. In certain instances, several paths may exist for forwarding network packets from the network device to another device or group of devices. In such instances, to improve or optimize the routing of the packets, the network device may form multi-path groups that include the interfaces connected to these multiple paths. In certain implementations, the multiple paths for forwarding the packets from the network device to the destination or intermediary node to the destination may result in the same or almost the same latency and may be considered equal cost with respect to each other. In such implementations, the multi-path groups may be referred to as equal-cost multi-path groups or ECMP groups.

Network packets destined for the same ECMP group are distributed across the interfaces belonging to the ECMP group. In certain implementations, portions of the network packets (e.g., source address, destination address, ports, etc.) are hashed to create signatures for the flows of network packets, such that the network packets belonging to the same flow are forwarded over the same output interface. The hash value for each network packet can be compared to a range of hash reference assigned to each output interface of an ECMP group. If the hash value for each packet falls within a range of hash references assigned to an output interface, the network device can route the network packet through the output interface. Hash functions can be used, in part, to enable high speed routing in support of transferring large amounts of data at relatively high speed across a network infrastructure.

As described in more detail below, elephant flows for the same output interface port are detected using statistical information stored in the congestion control block for each of the ECMP groups. Once the elephant flows directed to the same output interface are detected, at least in certain implementations, certain flows may be re-associated with other output interface flows to alleviate congestion related to multiple elephant flows ending up on the same output interface.

FIG. 1 illustrates a network infrastructure 100 according to certain embodiments. Network infrastructure 100 includes various network devices, 102-116. Network devices 102-116 are configured to route network packets between network devices 118, 120, 122, and 124. Any of network devices 118, 120, 122, and 124 can represent host or client side devices (e.g., network can flow in any direction between the devices). Various paths 126 are illustrated as connecting the network devices 102-116 and devices 118-124.

In network infrastructure 100, network device 110 interfaces to each of network devices 102, 104, 106, and 108. Likewise, each of network devices 112, 114, and 116 interfaces to each of network devices 102, 104, 106, and 108. Thus, network packets can flow directly between any of network devices 102, 104, 106, or 108 to any of network devices 110, 112, 114, or 116. Flow of network packets 128 is illustrated as traversing network infrastructure 100 via path 118-110-102-116-124. Flow of network packets 130 is illustrated as traversing network infrastructure 100 via path 120-110-102-114-122. Although flows of network packets 128 and 130 share resources of several network devices (such as network device 102), congestion may occur at an output port of network device 110, as will be become apparent via the discussion of FIG. 2. Furthermore, it should be noted that each of paths 126 may have similar bandwidth capabilities to aid in understanding of the congestion location.

Figure 2:
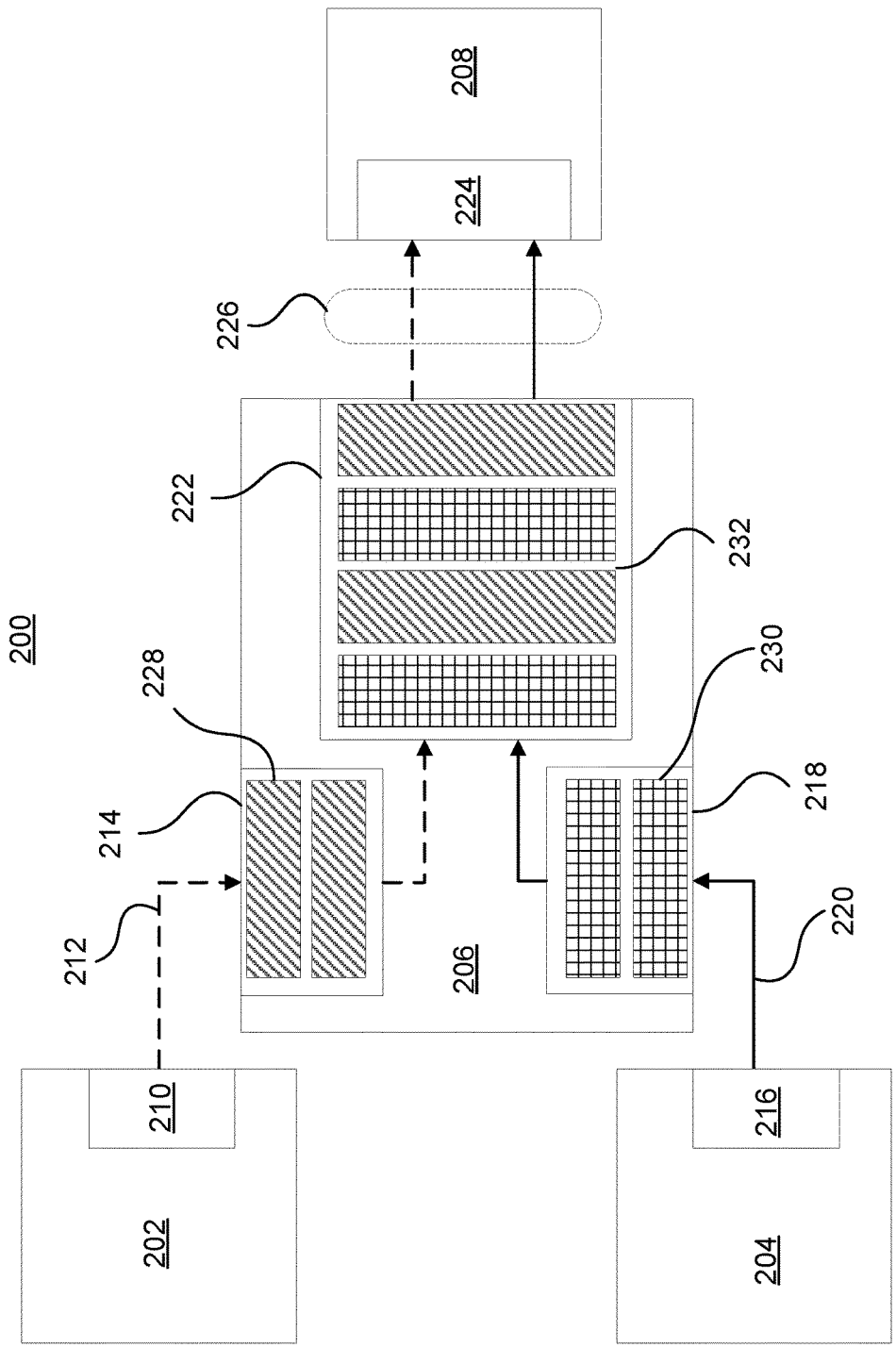
FIG. 2 illustrates a network device of a network infrastructure according to certain embodiments.

FIG. 2 illustrates an example network infrastructure 200, including network devices 202, 204, 206, and 208. Network devices 202, 204, 206, and 208 are communicatively coupled to enable flow of information between the network devices. Network device 206 can include network packet routing functionality wherein network device 206 can receive network packets via an input interface port and route the network packets to an appropriate output interface port. Network devices 202 and 204 include output interface ports 210 and 216 respectively. Network device 208 includes input port 224. Network devices 202, 204, and 208 can be host or client devices, for example (that may not include routing functionality).

Network device 206 can be similar in functionality to network device 110. Network device 206 is illustrated as receiving a flow of network packets 212 from network device 202 via input interface port 214. Network device 206 is also illustrated as receiving a flow of network packets 220 from network device 204 via input interface port 218. Each of flows of network packets 212 and 220 include network packets 228 and 230 respectively. As illustrated, network packets 228 can traverse or be stored within a buffer of input interface port 214. Network packets 220 can traverse or be stored within a buffer of input interface port 218.

Network device 206 is illustrated as routing both flows of network packets 212 and 220 to output port 222 to be output to network device 208 via transmission path 226. Transmission path 226 can be bandwidth limited via physical constraints of the transmission medium, capabilities of output port 222 of network device 206, input port 224 of network device 208, or other. Transmission path 226 and/or transmission paths between network devices 202, 204, and 206 (not shown) can have similar bandwidth transmission capabilities. As flows of network packets 212 and 220 are routed to output port 222, they may saturate output port 222. As illustrated, output port 222 may include a buffer or queue containing network packets 232 from flows of network packets 212 and 220. The rate at which network packets 232 are added to the queue can exceed the rate at which the network packets can be transmitted to network device 208, resulting in congestion and possible saturation. As illustrated, output port 222 contains twice as many network packets 232 as either input interface port 214 or input interface port 218. If transmission path 226 becomes congested, then network infrastructure 200 may encounter delays in network data being transmitted from network device 202 and/or 204 to network device 208. If network infrastructure 200 becomes saturated, network packets can become dropped and not reach their intended destination. It should be understood that, if, for example, input port 228 and output port 210 have similar data transfer bandwidth capabilities, it is unlikely that congestion would occur at input port 228 as the maximum possible amount of data transmitted via output port 210 may equal the maximum possible capability of input port 228 to receive data.

Figure 3:
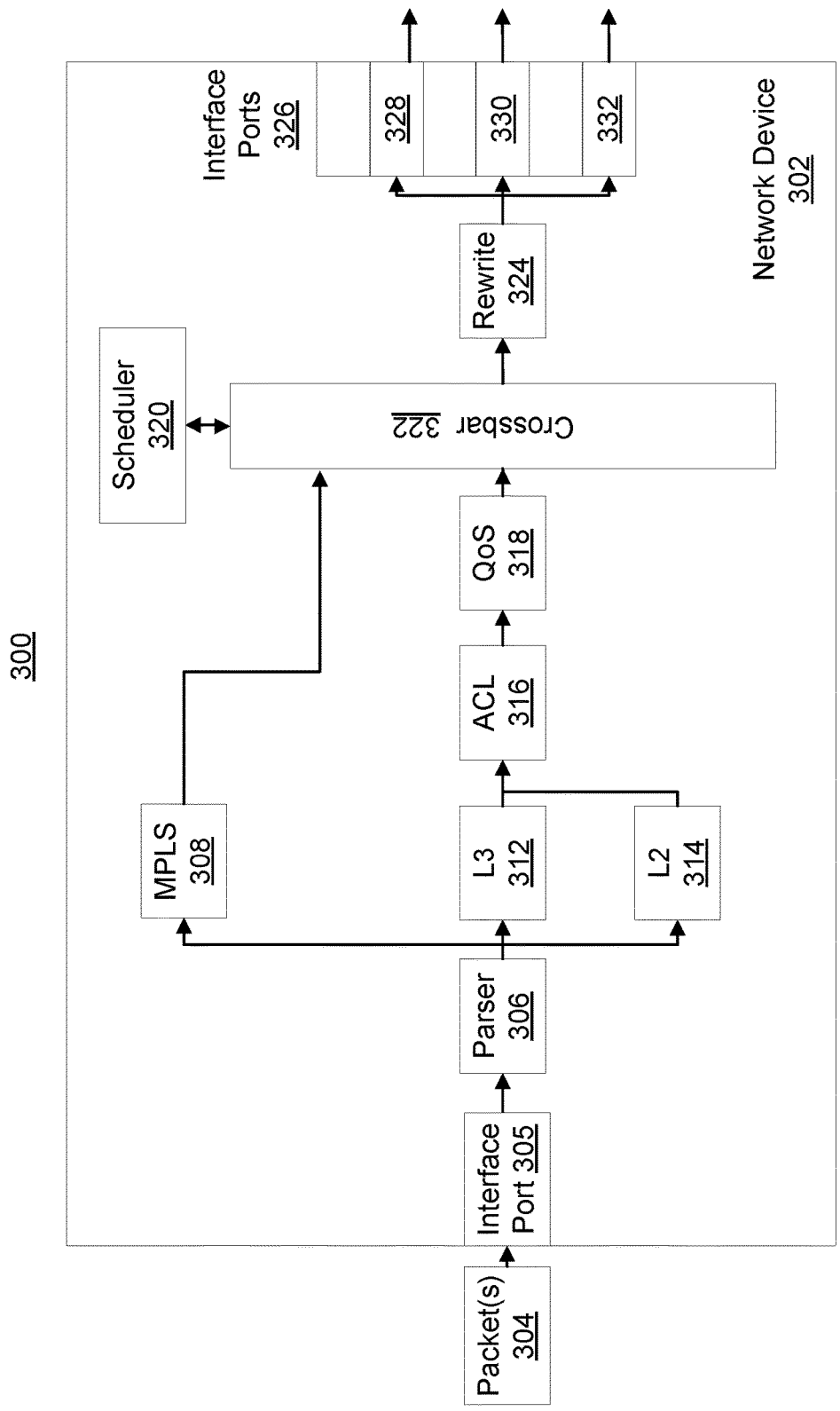
FIG. 3 illustrates a packet processor according to certain embodiments.

FIG. 3 illustrates a logical block diagram 300 illustrating techniques for processing and forwarding of network packets. The techniques of diagram 300 can be implemented by network device 206, for example. The packet processor can also be implemented using pipelined operations to support packet processing speeds for high-speed network data transfer operations, including forwarding information lookups and other packet processing operations. The packet processor can be implemented to provide forwarding of network packets as part of the data plane so that forwarding may be performed without software-based techniques.

Network packet(s) 304 can be received via a network interface, such via interface port 305. Interface port 305 can provide a physical layer (PHY) interface. Media Access Control (MAC) layer interface that can be implemented via interface port 305. Network packet(s) 304 can be analyzed to detect valid flows and segment the flow into datagrams (e.g., packets/frames). For instance, the PHY layer may receive and transmit data across physical connections (e.g., such as electrical signals received over twisted-pair coaxial cable or optical signals received over optical fiber). The PHY layer may implement different techniques dependent on the speed or type of network interface configuration (e.g., ethernet 10 base-T, 100 base-TX, and 100 base-T forms), such as encoding, multiplexing, synchronization, clock recovery, and/or data serialization. Various signaling standards, such as IEEE 802.3, may govern the performance of the PHY layer consistent with the open systems interconnection (OSI) model for communications. The MAC layer may delimit frames and packets from the flow of data. Error checking may also be implemented at the MAC layer, checking for different errors, such as frame check sequence (FCS), interframe gap enforcement, and frame preambles.

Packet parser 306 can receive network packets and separate the packet header from the packet payload. Packet parser 306 can parse the packet header to determine and/or extract data for making forwarding decisions for the packet. For example, packet parser 304 can extract different layer headers (e.g., L2, L3, and L4 headers) included in an Internet protocol (IP) version 4 packet, such as the source MAC address, the destination MAC address, the source IP address, the destination IP address, and port numbers. Using information from the layer headers, the network packets can be forwarded to Multiprotocol Label Switching (MPLS) module 308, Level 3 (L3) routing module 312, or Level 2 (L2) routing module 314. MPLS module 308 can use MPLS techniques to make forwarding decisions based on information in the header, bypassing Open System Interconnection (OSI) L2 and L3 routing decisions.

A network packet can be forwarded to L3 routing module 212 or L2 routing module 314 in order to determine forwarding and tunneling decisions based on information in the packet header (e.g., packet metadata) extracted by packet parser 306. For example, L3 routing module 312 can locate appropriate forwarding information through the use of Forwarding Table(s). Forwarding Table(s) can, in certain embodiments, be logically partitioned within L3 routing module 312. In certain embodiments, information can be organized and located in elements of Forwarding Table(s). L2 routing module 314 can perform lookups for data in layer 2 (L2) portions of the packet to perform L2 forwarding. L2 forwarding may access a MAC address table in forwarding tables (not shown) to perform two lookups (which may be in parallel or in series). These forwarding tables can also benefit from features of the disclosure. The first lookup may be performed with a key extracted from the packet header at packet parser 306 (e.g., a VLAN and source MAC address), to determine whether an entry for the packet is present in Forwarding Table(s). If the source MAC address is unknown, then a mapping determination may be made to map the source MAC address to a port identified in the packet header. If the MAC address is known but attached to a different port than indicated the MAC address table, than an operation may be performed to move the source MAC address to the port identified in the packet header. Otherwise, the MAC address is known in the MAC address table. Another look up to the MAC address table may also be performed at another key (the VLAN in the destination MAC address). The network packet may be routed if the MAC address table contains an entry for the destination MAC address owned by a network device (otherwise other operations may be performed, such as trapping the network packet for the CPU, bridging the packet out of a listing interface, or flooded out of all ports and an STP forwarding state).

L3 routing module 312 can perform lookups for data in layer 3 (L3) portions of the packet to perform L3 forwarding. For example, IP headers for the packet may be evaluated respect to entries and tables such as a routing or next top table, to determine forwarding to be performed. The previous examples of packet forwarding is not exhaustive, as many other forwarding systems may be made, including, but not limited to, forwarding for spanning tree protocol (STP) state checking, access port VLAN handling, VLAN membership checking, MAC2ME lookup, broadcast/multicast forwarding to a host CPU for the switch, tunnel start/termination lookup, longest prefix match, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and front/or various other destination resolution lookups. As packet forwarding make forwarding decisions about the packet, the decisions are maintained as packet metadata. The packet metadata can be provided to scheduler 320 for scheduling determinations.

Forwarding Table(s) may be implemented in one or multiple storage devices, such as various memory devices (e.g., a CAM, such as TCAM, and/or random access memory) to store table data for performing different routing decisions. Forwarding Table(s) may include a VLAN table, MAC address table, routing table, adjacency table, next top table, tunnel start table, virtual routing and forwarding identifier table, tunnel termination table, and/or actions table. Each of these different tables may be utilized to retrieve or determine packet forwarding decisions, tunneling decisions, and associated modifications that may need to be made to network packets.

Access Control List module 316 can, based on rules) compare information obtained from a network packet header or elsewhere to make a determination if the network packet header is allowed to be directed to specific destination(s). For example, Access Control List module 316 can include a list of source address(es) of network packets that are allowed to be forwarded to certain address(es). Access Control List module 316 can also include a list of source address(es) of network packets that are not allowed to be forwarded to certain address(es). Additional information can be included within Access Control List module 316 such as protocol version(s), identifying information, or other. After Access Control List module 316 determined whether a specific network packet is approved for forwarding, the network packet can be forwarded to Quality of Service module 318.

Quality of Service module 318 can, based on certain rules, prioritize forwarding of certain network packets over others. For example, certain rules can, based on a QoS policy, can specify that types of packets (such as those associated with video or voice over internet) take priority over other packets (such as for mass file transfers). As another example, a QoS policy can specify that certain users take priority over others. Quality of Service module 318 can withhold certain network packets from proceeding to Crossbar 322. Crossbar 322 can be a switch controlling multiple inputs and multiple outputs. Quality of Service module 318 can comprise multiple queues of output data, each having a different priority. The multiple inputs can each be associated with MPLS module 308, QoS module 318, or other. The multiple outputs can each be associated with an outgoing interface port of Interface ports 326. Illustrated are three example routings of data to interface port 328, interface port 330, and interface port 332 respectively before proceeding to a network device external to network device 302.

Scheduler 320 can control the buffering of packets and scheduling of operations within the network device 302 For example, scheduler 320 can implement a memory management unit to allocate available memory segments for buffering stored packets. Scheduler 320 can also implement a memory management unit to allocate packets from a buffer for final processing and egress. Scheduler 320 can provide the appropriate metadata for a packet. Once a packet has been scheduled, Scheduler 320 can utilize Crossbar 322 and, PHY interface, and/or a MAC layer interface to transmit network packets as network data. Rewrite module 324 can be used to rewrite encapsulation or other information after a packet has traversed crossbar 322, for example. The rewrite module can rewrite encapsulation information to, for example, enable tunneling in the packet, enforce ACL, or appending a next-hop address.

Figure 4:
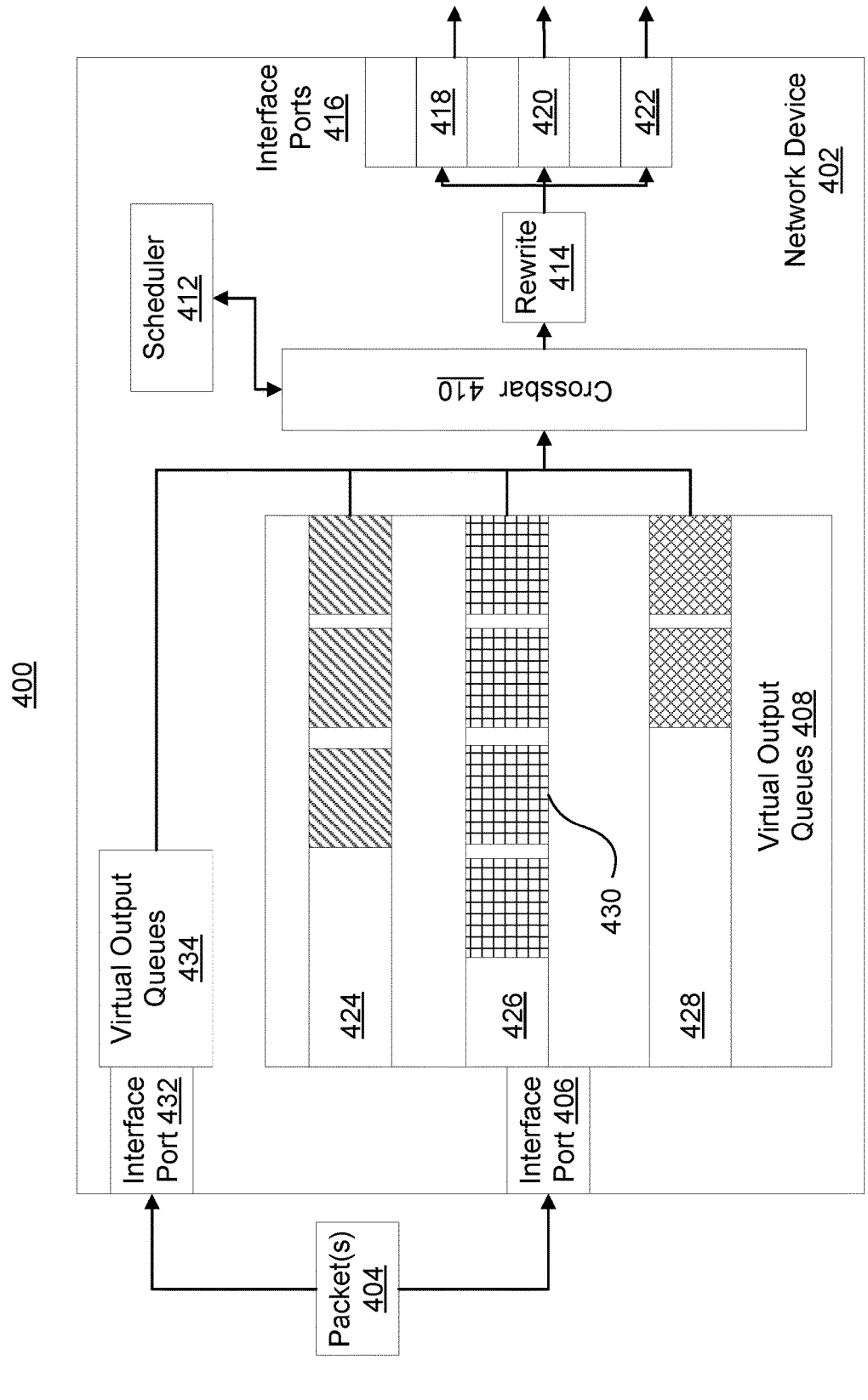
FIG. 4 illustrates a network device with virtual output queues according to certain embodiments.

FIG. 4 illustrates a network device 402 according to certain embodiments. Network device 402 can be similar to network device 302, 206, and/or 110. Network device 402 can include input interface ports 406 and 432 for receiving network packet(s) 404, which can be similar to network packet(s) 304. Each input interface port 406 and 432 can be associated with a respective set of Virtual Output Queues 408 and 434. Virtual Output Queues 408 is illustrated as including multiple virtual output queues 424, 426, and 428. Each virtual output queue 424, 426, and 428 can be associated with a respective output interface port 418, 420, and 422. Each of virtual output queues 424, 426, and 428 can function as a queue or buffer to temporarily store data 430 to be output by a corresponding output interface port (e.g., ports 418, 420, or 422). Data 430 can be a network packet or a pointer to a network packet, for example. Each virtual output queue used herein can store network packets, pointers to network packets, indicators of network packets, or combinations thereof.

Input interface port 432 can be associated with virtual output queues 434. Virtual output queues 434 can be similar in function and organization as virtual output queues 408. For example, virtual output queues 434 can include multiple virtual queues similar to virtual output queues 424, 426, and 428. Each output queue of virtual output queues 434 can each be associated with a corresponding output port (such as one of ports 418, 420, or 422). Virtual output queues 434 can include a virtual output queue corresponding to output port 418 and virtual output queues 408 can also include virtual output queue 424 corresponding to output port 418. If output port 418 becomes congested, then virtual output queue 424 and an output queue of virtual output queue 434 may begin to fill. For example, virtual output queue 426 is illustrated as being more full (at higher capacity) than virtual output queue 428. It should be noted that data 430 can be network packets from multiple input flows that have been routed to a same output port (as described regarding FIG. 2).

Crossbar 410 can be similar crossbar 322. Scheduler 412 can be similar to scheduler 320. Rewrite module 414 can be similar to rewrite module 324. Interface ports 416 can be similar to interface ports 326.

Figure 5:
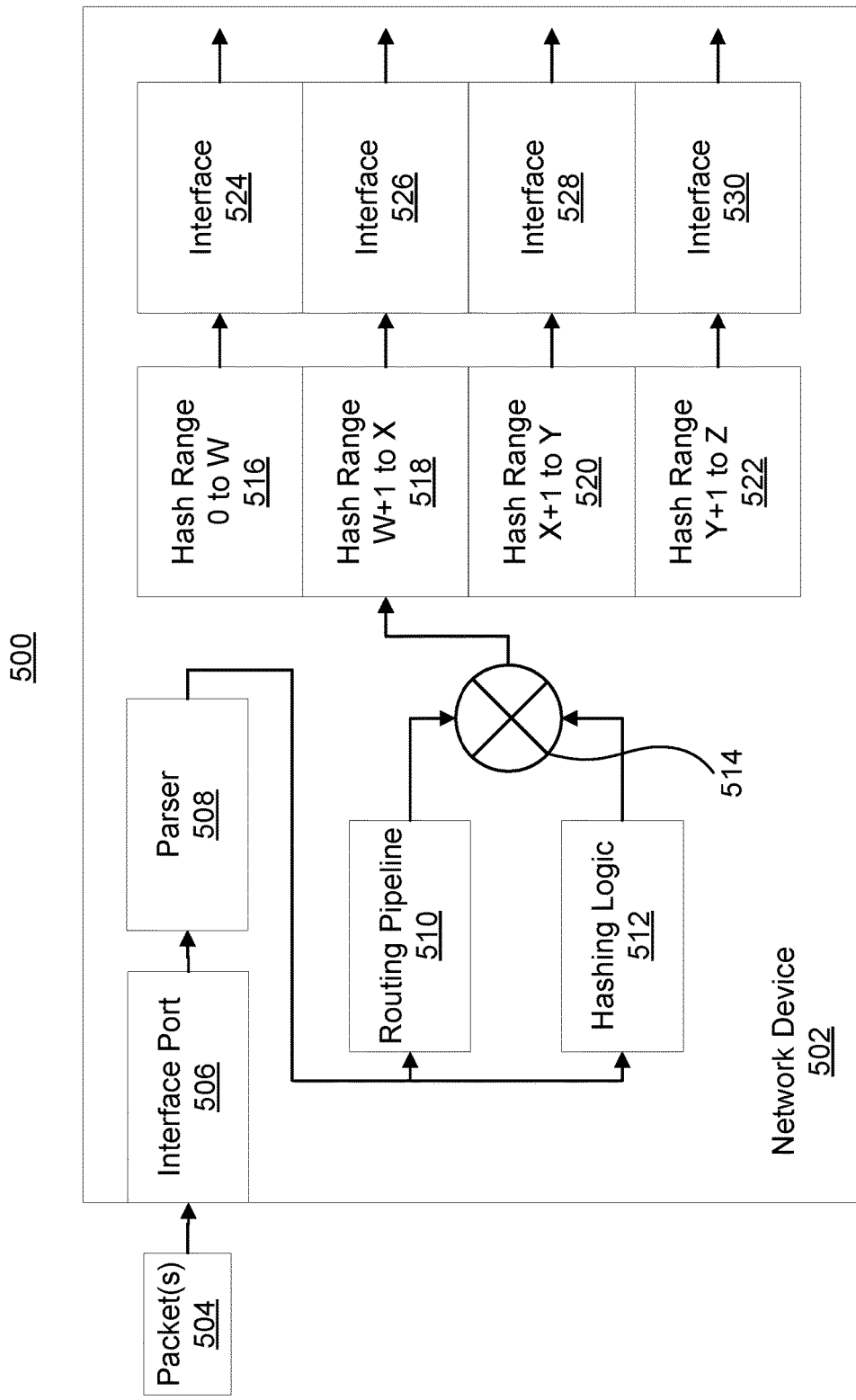
FIG. 5 illustrates a network device with hashing functionality according to certain embodiments.

FIG. 5 illustrates a logical diagram of a network device 502 according to certain embodiments. Network device 502 can be a part of a network infrastructure 500. Network device 502 can receive network packet(s) 504 from other network devices (not shown) of network infrastructure 500. Network packet(s) 504 can be received at input interface port 506. Input interface port 506 can be similar to interfaces ports 406, 432, 305, 214, or 218. Network packets 504 can then proceed to parser 508 which can be similar to parser 306. Parser 508 can parse network packet(s) 504 to obtain information for routing of network packet(s) 504. For example, parser 508 can obtain destination, VLAN, MAC, source and/or destination IP address, or other information that can be parsed in order to determine, by network device 502, a destination address to route network packet(s) 504. Routing pipeline module 510 can proceed to process network packet(s) 504 and can include functionality of network device 302.

Routing Pipeline 510 can extract and use packet information from network packet(s) 504 to, for example, select an Equal Cost Multi-Path (ECMP) group, next-hop, or other group for routing of network packet(s) 504. A specific group can be selected from a plurality of groups (not shown) by information determined by routing pipeline 510. Routing pipeline 510 can include, for example, hash or other functionality to generate a group identifier as an egress path. Items 508-530 can provide functionality to route network packets into ECMP groups and can logically be located between, for example, interface port 406 and virtual output queues 408.

Hashing logic 512 can generate hash value(s) using information parsed from network packet(s) 504 by parser unit 508. These hash value(s) can enable a certain interface to be selected within a specific ECMP group. Operator 514 can be configured to select an appropriate ECMP table and interface within the ECMP using hash value(s) generated by hashing logic 512 and data generated by routine pipeline 510. Operator 514 can, for example, locate one of hash ranges 516, 518, 520, or 522 that hash value(s) fall within. For example, a hash value of 0x500 may be generated. Hash range 518 may have hash reference ranges of between 0x400 and 0x599. Similarly hash range 516 may include hash ranges of between 0x000 and 0x199. In this example, the hash value of 0x500 would fall within hash range 518 and not hash range 516. Each of hash ranges 516, 518, 520, and 522 can correspond to an interface. For example, Hash range 518 can correspond with interface 526. Each of interfaces 524, 526, 528, and 530 can indicate an interface port to output network packets. Each of the interface ports indicated by an interface can be associated with a virtual output queue (i.e., each virtual output queue can store packets, each having a different hash value). A virtual output queue can also be shared by multiple ECMP groups. A virtual output queue can therefore include packets with different group identifiers. Group identifiers can be hashed from network packets. ECMP group identifiers can be a result of processing a packet by an L3 forwarding pipeline, which may generate ECMP group identifier(s) to identify an egress path for a packet.

As illustrated in FIG. 4, interface port 406 can be one of a plurality of interface ports (406 and 432) used as input interface ports. Each input interface port can be associated with a plurality of virtual output queues. In certain embodiments, each virtual output queue of an input interface port can correspond to a single output interface port.

After an ECMP group and a hash range are selected by operator 514, an interface can be associated with network packet(s) 504. The network packet(s) 504 can then be forwarded to an appropriate interface port to be output to a next hop address. In certain embodiments, ECMP or Weighted Cost Multipath (WCMP) rules can be applied by operator 514 to generate a hash value and/or to select a hash range. Furthermore, ECMP and WCMP groups can be generated. An ECMP group can be a group of interfaces that have been determined to have equal cost. The cost can be associated with network latencies, current interface loading conditions, or other. A WCMP group can be a group of interfaces with weighted (e.g., unequal) costs. For example, each interface of an ECMP groups can be associated with an equal hash range that a hash value can fall within. Interfaces of a WCMP group can be associated with unequal hash ranges.

FIG. 6 illustrates a Congestion control block 600 (CCB) that can be used to capture statistical information, set congestion avoidance parameter(s), and/or implement congestion avoidance according to certain embodiments. Congestion control block 600 includes an interface group 602. Interface group 602 can include a plurality of output interfaces, such as interfaces 524-530. In certain embodiments, Congestion control block 600 can be associated with each ECMP interface group of a network device.

Congestion control block 600 can include an enable bit 604. Enable bit 604 can be a flag that indicates, according to its value, whether congestion avoidance is active (e.g., congestions are being monitored and congestion avoidance techniques activated). Triggered bit 606 can be used to indicate whether congestion has been detected and congestion avoidance techniques activated. Flow 1 Hit Count 608 can be used to indicate a number of packets that have been counted during a certain time period from a specific flow of network packets. Flow 1 can be one of a plurality of flows associated with an output port wherein the flows have been ranked. For example, Flow 1 can be a top ranked flow, according to volume of data transmitted for a given time period. Flow 1 Hash Value 610 can be a hash value generated for Flow 1. This hash value can be generated by hashing logic 512, for example. Similarly Flow 2 Hit Count 612 can be a number of packets received from a second ranked flow of data packets routed to the same output queue as Flow 1. Flow 2 Hash Value 2 614 can be a hash value associated with Flow 2.

Interface ID 616 can be an identifier of a certain interface of interface group 602 that is experiencing congestion. For example, interface ID 616 can indicate that congestion is detected on output interface 524, 526, 528, or 530. Timer 620 can be a value (that can be user assignable) to indicate a time period in which statistics (such as flow counts) are collected before being reset. Timer 620 can be used to limit an amount of data in which statistics for network packets within a queue are analyzed to determine high flow data flows and enable congestion avoidance on more problematic high bandwidth utilizing flows (e.g., high volume of packets in a relatively short period of time) as opposed to a trickle flow (e.g., high volume of packets over a relatively long period of time). Timer 620 can be used to analyze collected congestion statistics for a fixed amount of time. For example, Timer 620 can be set to run down from 5 seconds to 0 seconds before automatically resetting back to 5 seconds, along with collected statics of a congestion control block. Congestion control block 600 is a non-limiting example and may include additional or other fields. For example, congestion control block 600 may include threshold values for flow packet counts, additional flow counters/hash values, or other information/variables.

Figure 7:
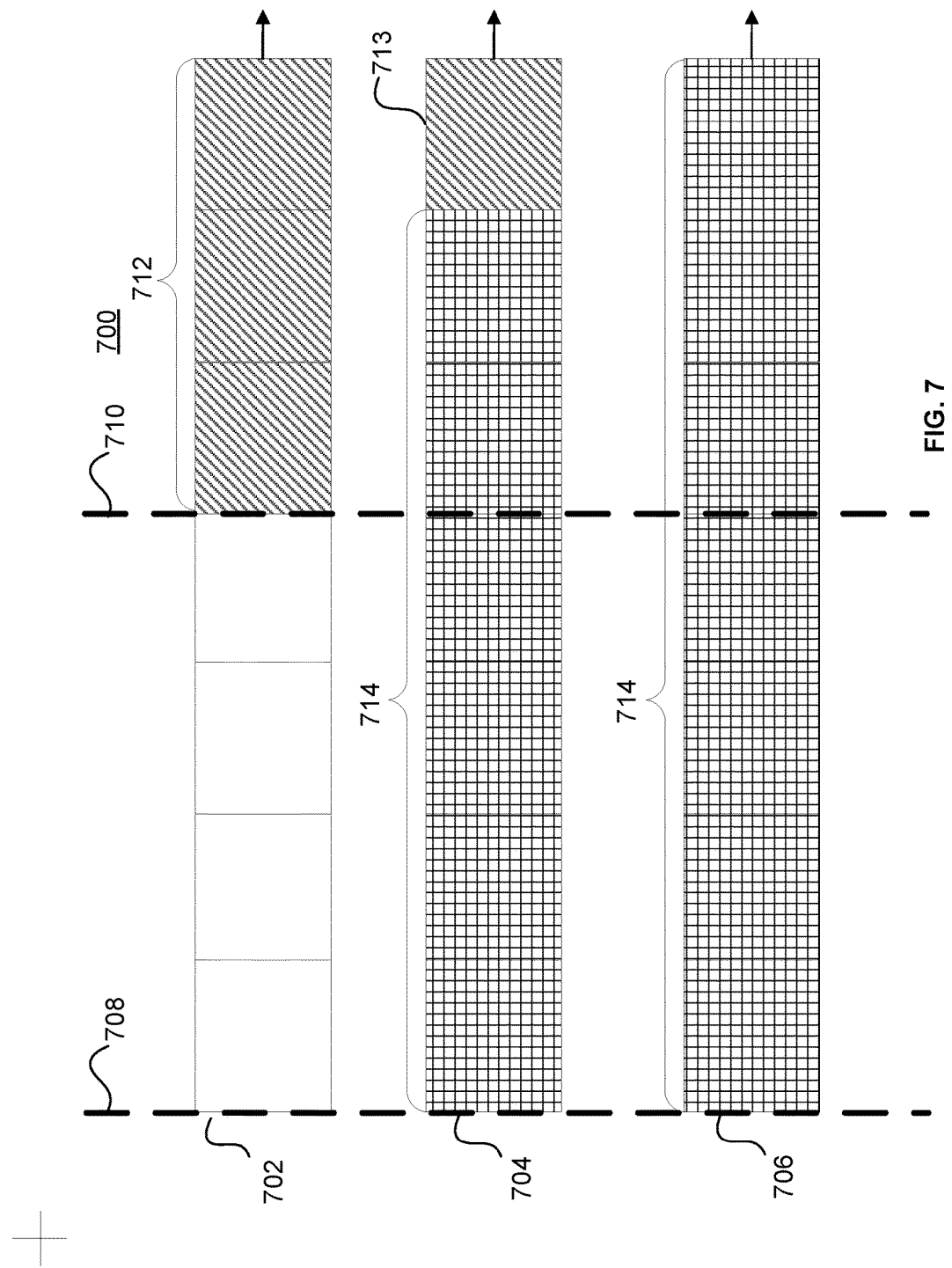
FIG. 7 illustrates several states of a virtual output queue, according to certain embodiments.

FIG. 7 illustrates a plurality of states 700 of a virtual output queue. The states are indicates as 702, 704, and 706. State 702 indicates that data from three stored packets 712 are stored within the queue. Stored packets 712 are illustrated as being shaded. The remaining four locations are empty (do not store data from data packets) and are illustrated as not being shaded. Threshold 710 is a threshold at which congestion can be detected. This threshold can be user assignable, determined by a network device, or preconfigured. When a number of network packets stored within a virtual output queue reaches threshold 710, a network device can be triggered to accumulate data to populate congestion control block 600, for example. In this example, each of stored packets 712 can be analyzed to determine their hash value, source address, destination address, etc. which can be used to identify a flow of network packets to which each network packet is a part of. These flows can then be ranked to identify flows with the highest volume of data stored in a virtual output queue for a given time period. This information can then be used to update congestion control block 600, for example.

At state 704, congestion has proceeded to the point wherein the virtual output queue is full (indicated by reaching threshold 708). At this point, any new block added to the queue may be dropped and not forwarded to an output port. At state 704, a count of the number of packets from each flow may not be updated in order to avoid double counting of packet 713, for example. Packets 714 may therefore not be counted yet at state 704. At state 706, packets 714 may now be counted as packet 713 has been routed to an output port. A network device may include rules not to count packets within a queue until already counted packets have left the queue to, for example, avoid double counting of packets. In the alternative, if a new statistics gathering time window (such as indicated by timer 720) has been reached, all of the current packets within a virtual output queue may be counted. Alternatively, they may only be counted if they have exceeded threshold 710. In still other embodiments, each new packet added to a virtual output queue may be counted.

Methods

Figure 8:
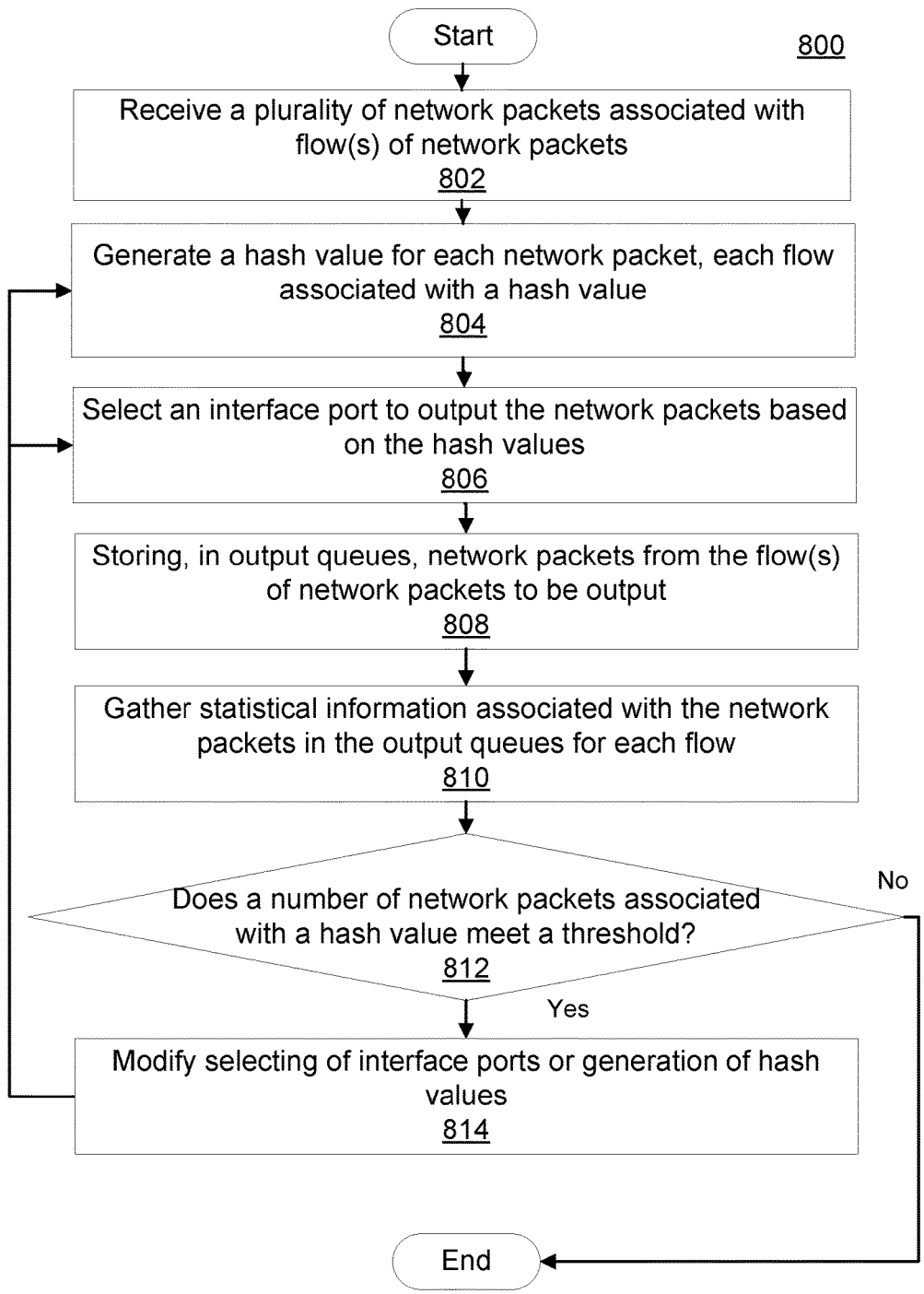
FIG. 8 illustrates a flowchart of a method of operation of a network device according to certain embodiments.

FIG. 8 illustrates an example flowchart 800 for methods for implementing operation of network devices according to certain embodiments. These methods may be implemented by the systems described above, such as for example network device 206, 302, 402, or 502. At 802, a plurality network packets can be received by a network device, the network packets associated with flows of network packets. At 804, hash value(s) can be generated for each of the network packets. At 806, an interface port can be selected to output each packet. The generating of hash values and selection of ports can use techniques disclosed for operation of network device 502, for example.

At 808, data from the flows of data can be stored within a virtual output queue. The output queue can be a virtual output queue, as described herein. At 810, statistical information associated with the network packets in the output queues can be gathered. Furthermore, each network packets can be identified as belonging to a flow based, for example, on the hash value(s) generated at 804. The identification of the flow(s) of network packets that are contributing to the congestion can enable a network device to react accordingly, such as by rerouting the flow(s) to alternate output port(s).

Without such statistical information, a network device may be unable to detect a flow of packets and, instead, route packets on a per-packet basis, as disclosed herein.

At 812, a determination can be made if a number of packets associated with a hash value meets a threshold. For example, statistics can be collected to identify flows at 810 that are contributing large amounts of data to an output queue and meet the threshold. Flows that meet the threshold can be determined to be elephant flows. At 812, a determination can be made if one or multiple flows have contributed enough data that congestion avoidance should be enabled. At 814, congestion avoidance can be enabled by modifying a selection of interface ports or a generation of hash values. For example, a hashing technique can be modified such that two elephant flows that were previously hashed to the same output interface of an ECMP group are now hashed to two separate output interfaces of the ECMP group. Alternatively, or additionally, hash reference ranges to which hash values are compared can be altered. For example, a particular hash range can be split such that two elephant flows that previously were allocated to the same range are now allocated to two separate ranges (and two separate interfaces).

Figure 9:
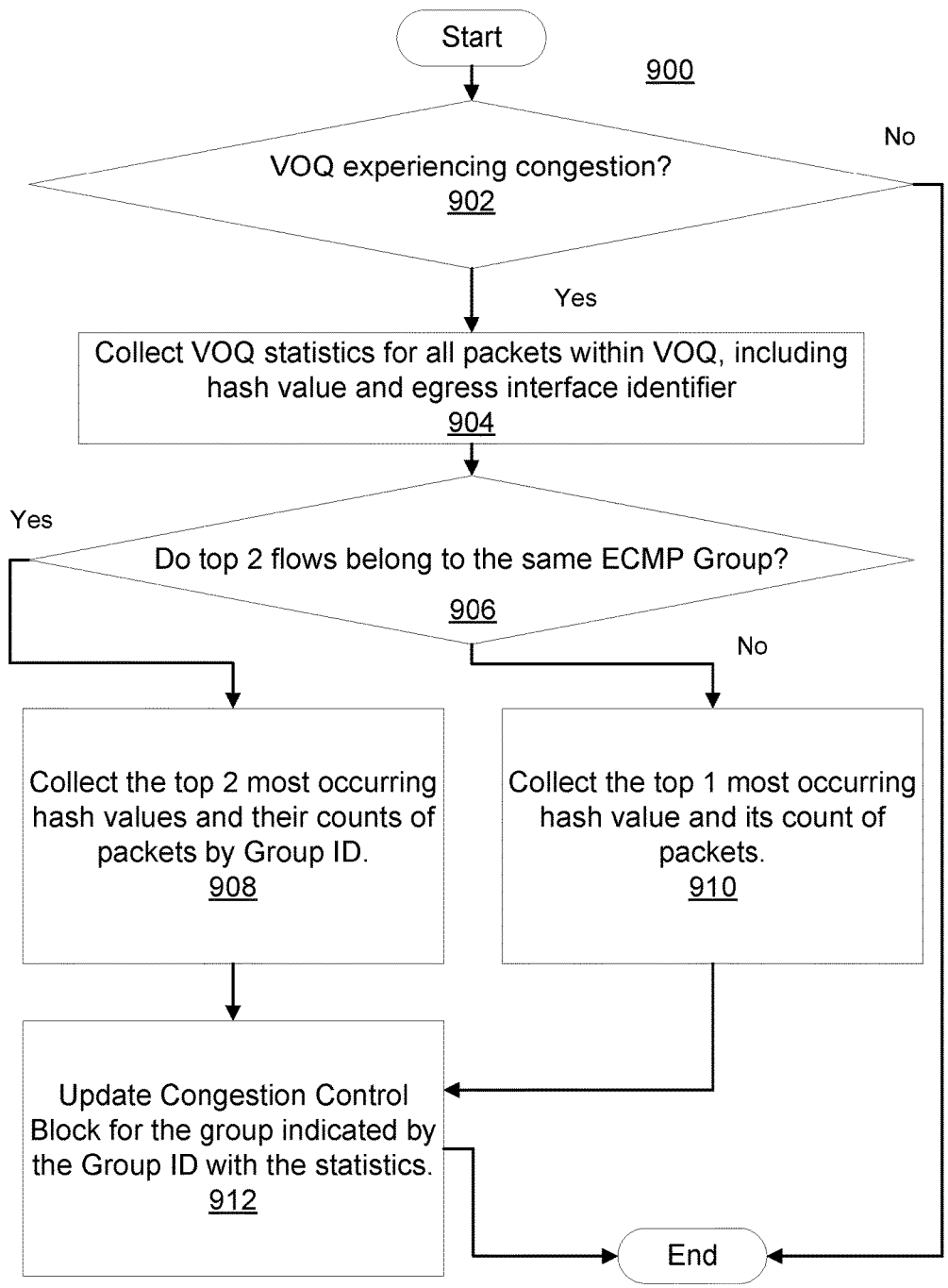
FIG. 9 illustrates a flowchart of a method of operation of a network device to collect statistical information according to certain embodiments.

FIG. 9 illustrates an example flowchart 900 for methods for implementing operation of network devices according to certain embodiments. The method of flowchart 900 can be used by congestion control block logic to, for example, update statistical information stored within a congestion control block (such as congestion control block 600) associated with an ECMP group. At 802, a determination can be made as to whether a virtual output queue is experiencing congestion. This determination can be made by, for example, determining that a number of network packets with a queue has exceeded a threshold (such as threshold 710). If not, then the method can end as no congestion may have been determined.

If congestion has been determined then, at 904, statistics for the virtual output queue can be collected and/or ranked for all packets within the virtual output queue (assuming that packets in the virtual output queue have not already been counted, as described for FIG. 7). At 906, a determination can be made if the top two flows of network packets contributing the most data packets to the virtual output queue for a given time period belong to the same ECMP group. This determination can be made based on an ECMP group identifier associated with each packet within an output queue. If so, then hash values and counts of number of packets associated with each of the top two flows of network packets can be collected. At 910, if the top two flows do not belong to the same group, then the top flow hash value and count value can be collected. At 908, if the top two flows do belong to the same group, then the top two flow hash values and count values can be collected. At 912, a congestion control block associated with the ECMP group to which the top one or two flows belong can be updated according to flowchart 1000.

Figure 10:
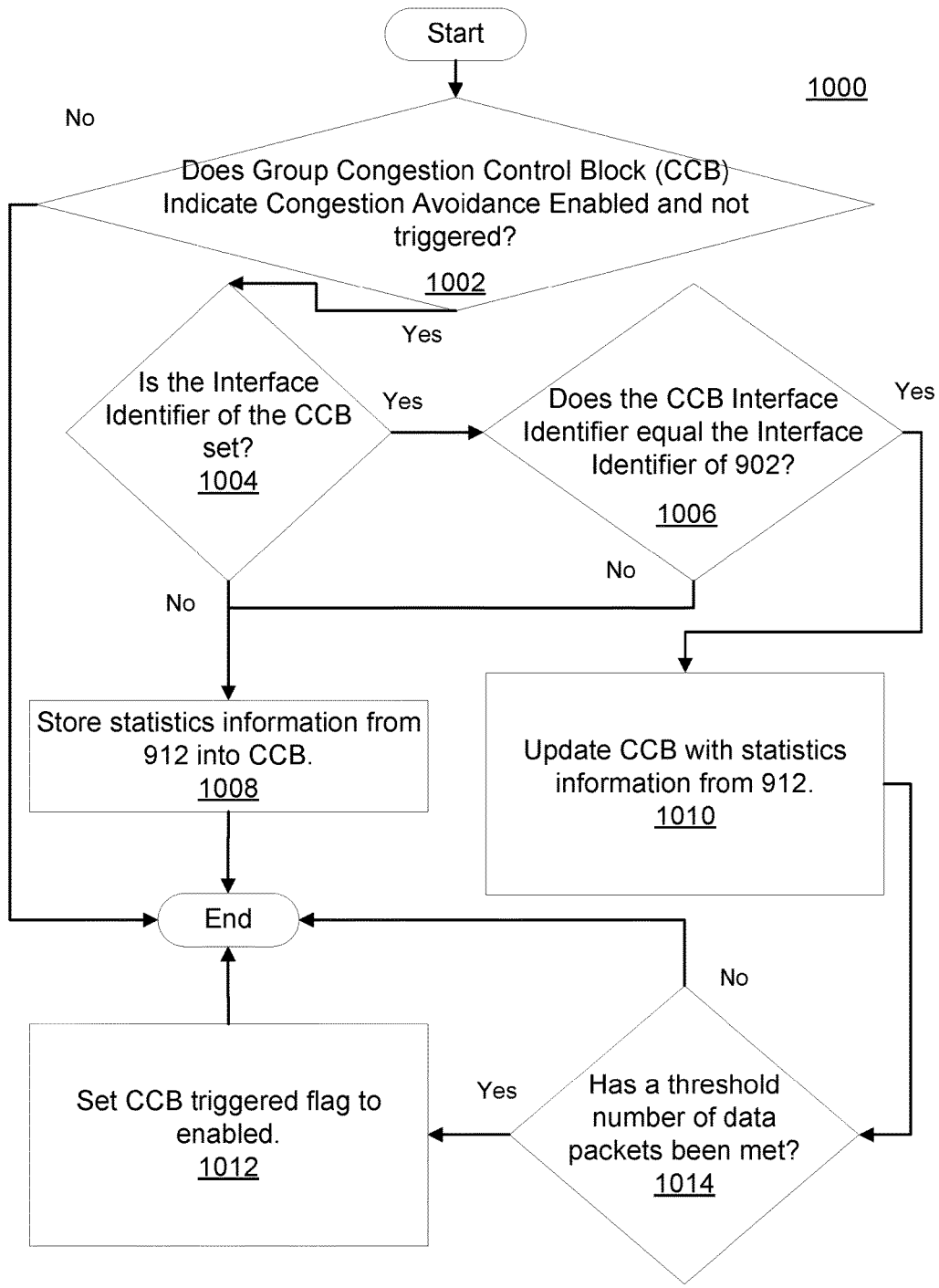
FIG. 10 illustrates a flowchart of a method of operation of a network device to store statistical information according to certain embodiments.

FIG. 10 illustrates an example flowchart 1000 for methods for implementing operation of network devices according to certain embodiments. The method of flowchart 1000 can be used by network flow detection logic to, for example, identify elephant flow(s) that may be congesting a network device. At 1002, a determination can be made as to whether information from a congestion control block indicates that congestion avoidance is enabled and not triggered. If congestion is already triggered or the congestion avoidance is not enabled for an ECMP group, the method can end. If however, these conditions are true, flowchart 1000 can proceed to 1004 wherein a determination can be made if an interface identifier of the congestion control block is set. If it is not set, then congestion information may not have been stored by the congestion control block. If the interface identifier is not set, then, at 1008, statistics information can be copied directly into the congestion control block, the information representing a current state of network packets stored within a VOQ. The information copied can include a Flow 1 Hit count, a Flow 1 Hash value, a Flow 2 Hit Count, a Flow 2 Hash value, an interface ID, or other. These attributes can be similar to those explained regarding congestion control block 600.

If the interface identifier is set at 1004, then, at 1006, a determination can be made if the interface identifier matches an interface identifier already stored in a congestion control block. If not, then the gathered statistical information can be stored in the congestion control block at 1008, overwriting existing congestion control block information. If the interface identifier matches the interface identifier stored within the change control block, then, at 1010, the change control block can be updated with statistical information from 912.

Updating the change control block with statistics information at 1010 can include comparing hash values current stored as Flow 1 Hash Value or Flow 2 Hash value to hash values determined at 912. If either of the hash values determines in 912 equals a hash value stored in the congestion control block, then the count of hash value of 912 can be added to the corresponding count of a hash value of the congestion control block. Otherwise, hash values of the congestion control block and corresponding count values can be overridden with statistics information obtain at 912.

At 1014, a determination can be made if a threshold number of data packets have been met by a hash count of the change control block. If the threshold has been met by a hash count of the congestion control block, then, at 1012, a triggered flag can be enabled within the congestion control block to indicate that congestion avoidance should be triggered. Otherwise, the flowchart 1000 can end. The method of flowchart 1000 can be operated in parallel with the method of flowchart 900. The method of flowchart 900 can operate to obtain statistical information of a virtual output queue of a network device. The method of flowchart 1000 can operate to update a congestion control block with statistical information obtain via the method of flowchart 900. Furthermore, the method of flowchart 1000 can be used to identify one or more elephant flows that may be being routed by a network device.

Figure 11:
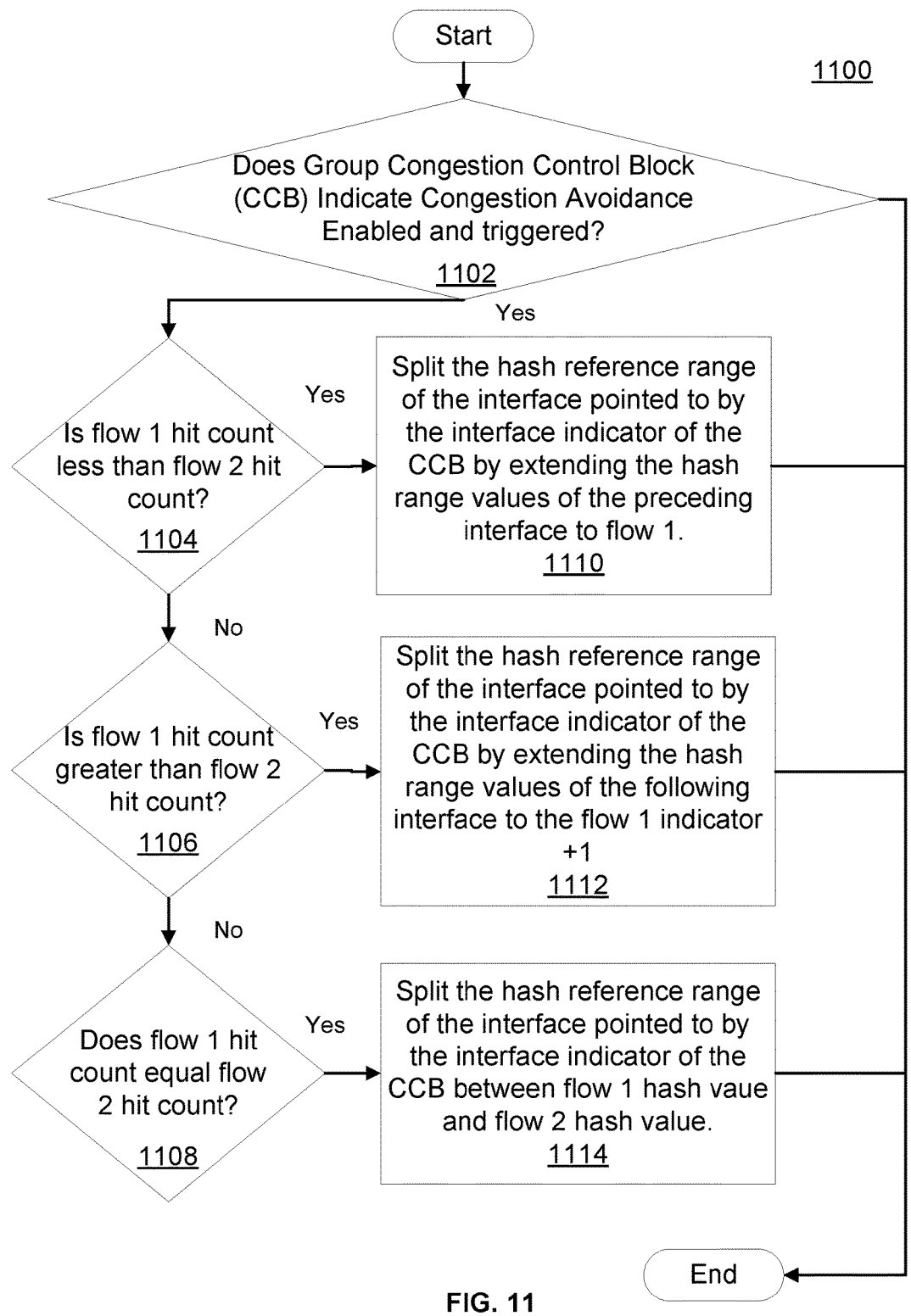
FIG. 11 illustrates a flowchart of a method of operation of a network device to implement congestion avoidance according to certain embodiments.

FIG. 11 illustrates an example flowchart 1100 for methods for implementing operation of network devices according to certain embodiments. The method of flowchart 1100 can be used by congestion avoidance logic to, for example, identify elephant flow(s) that may be congesting an output port of a network device. At 1102, a determination can be made if a congestion control block indicates that congestion avoidance is enabled and triggered for an ECMP group. If not, the method can end. If so, then, at 1104, a determination can be made if a value of Flow 1 Hit Count of a congestion control block is less than a value of a flow 2 hit count of a congestion control block. If so, then, at 1110, a range of hash references values associated with an interface indicated by the interface identifier of the congestion control block can be split. The splitting can include extending a hash reference range of a preceding interface hash reference range to the hash reference of flow 1. The remainder of the interface hash reference range can extend from the hash reference of flow 1 to the high end of the hash reference range. In this manner, the hash reference ranges of the two adjacent interfaces can be of different size of ranges. The larger flow of data (flow 2)

can be kept associated with its original reference whereas the flow 1 can be moved to a preceding interface.

At 1106, a determination can be made if Flow 1 Hit Count is greater than flow 2 hit count. If so, flowchart 1100 can proceed to 1112 wherein the hash reference range of the interface can be split. In this instance, the hash reference range can be split from Flow 1 Hash Value+1 to the end of the hash reference range of the interface following the interface identifier by the congestion control block as being congested. By extending the flow range from Flow 1 hash value+1, Flow 1 is not hashed to this hash range. Similar to 1110, 1112 maintains the larger flow of data (flow 1) in the interface and moves flow 2 to the following interface.

At 1108, a determination can be made if Flow 1 Hit Count and Flow 2 Hit Count are equal. If so, then at 1114 the congested interface indicated by the congestion control block can be split between Hash Value 1 and Hash Value 2. For example, Flow 1 Hash Value can be added to Flow 2 Hash Value and the summation halved. The interface can then be split into two separate hash reference ranges with each of flow 1 and flow 2 being directed to a different hash reference range. Optionally, either of these ranges can be merged with an adjacent hash reference range to assign a flow to a different interface as the congested interface.

Figure 12:
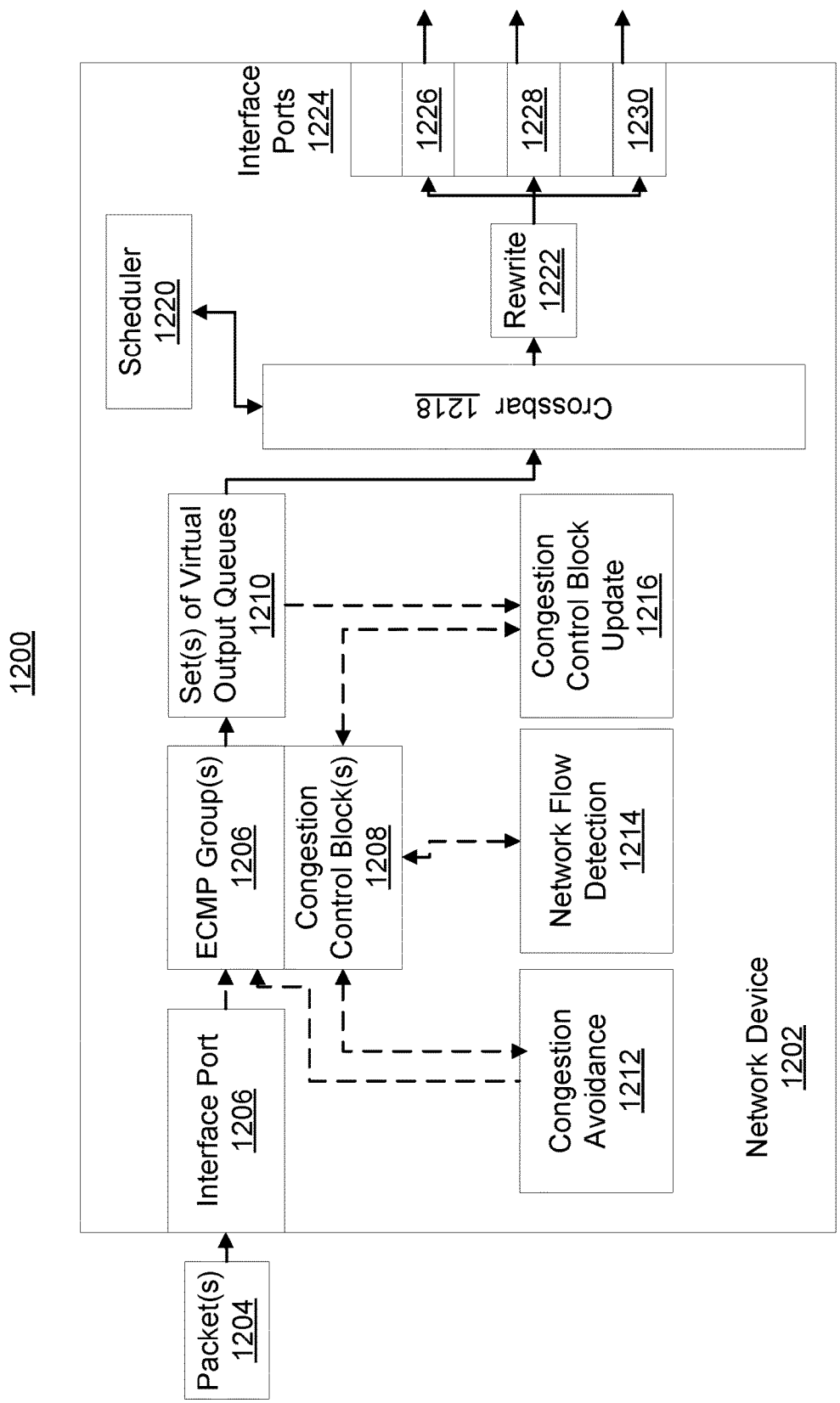
FIG. 12 illustrates a network device according to certain embodiments.

FIG. 12 illustrates a logic representation of network device according to certain embodiments. Network device 1202 can receive network packet(s) 1204 from the network. Network packet(s) can be received at interface port 1206. Interface port 1206 can be similar to interface port 506, 406, or 305, for example. Network packet(s) 1204 can then be processed by the parser 508 and routing pipeline 510 to be directed to an ECMP group 1206 from multiple ECMP groups. ECMP group(s) 1206 can each include functionality of items 508-530 of FIG. 5, for example, and can include a plurality of interfaces (not shown). Each of the plurality of interfaces can correspond to an output port, such as ports 1226, 1228, or 1230.

Each of set(s) of virtual output queues 1210 can include a virtual output queue associated with an output port, such as ports 1226, 1228, or 1230. Network packets to be output by one of ports 1226, 1228, or 1230, selected by an interface of ECMP group(s), can be stored by a corresponding virtual output of set(s) of virtual output queues 1210. Furthermore, each ECMP group of ECMP group(s) 1206 can be associated with a respective congestion control block(s) 1208. Congestion control block(s) 1208 can be similar to congestion control block 600.

Congestion control block update logic 1216 can include functionality illustrated by flowchart 900. Congestion control block update logic 1216 can periodically inspect network packets stored within set(s) of virtual output queues 1210, such as when a threshold of a virtual output queue is met by a number of network packets stored therein. Congestion control block update logic 1216 can update congestion control block(s) with statistical information gathered from network packets stored in a virtual output queue including hash value, network packet count, interface identifier, or other information. A specific congestion control block can be selected to be updated based upon a group identifier associated with each of the network packets stored in a virtual output queue.

Network flow detection logic 1214 can include functionality illustrated by flowchart 1000. Network flow detection logic 1214 can inspect statistical information collected within congestion control block(s) 1208 to determine if a number of packets associated with a specific hash value meets a threshold. If so, the packets can be determined to be associated with a flow and possibly an elephant flow. Furthermore, network flow detection logic 1214 can determine if multiple elephant flows are being routed by the network device 1202 through a same output port (leading to congestion). If the collected congestion statistics do not reach the congestion threshold value before a timer field of a change control block runs out (e.g., reaching a value of 0), then the statistics can be cleared to all zeroes (i.e., reset), and the timer can be reset.

Congestion avoidance logic 1212 can include functionality illustrated by flowchart 1100. Congestion avoidance logic 1212 can, upon identification of an elephant flow, modify distribution of the flow of network packets across the interfaces included in the ECMP Group(s) 1206 to, for example, route the elephant flow to a different output port. Alternatively, congestion avoidance logic 1212 can route two identified elephant flows to separate output ports. Congestion avoidance logic 1212 may also route packets other than an elephant flow to different output ports to avoid the output port of the elephant flow.

Congestion control block update logic 1216, network flow detection logic 1214, and/or congestion avoidance logic 1212 can be implemented via a processor executing instructions stored in non-transitory memory, hardware logic gates, or via a combination of the preceding. In certain embodiments, congestion control block update logic 1216, network flow detection logic 1214, and/or congestion avoidance logic 1212 can share network device 1202 resources in any combination. For example, all or any combination of congestion control block update logic 1216, network flow detection logic 1214, and congestion avoidance logic 1212 can share a memory device, processor, hardware device, or other. Crossbar 1218 can be similar to crossbar 322. Scheduler 1220 can be similar to scheduler 320. Rewrite module 1222 can be similar to rewrite module 324. Interfaces ports 1224 (include ports 1226, 1228, and 1230) can be similar to interface ports 326.

Computing Systems

Figure 13:
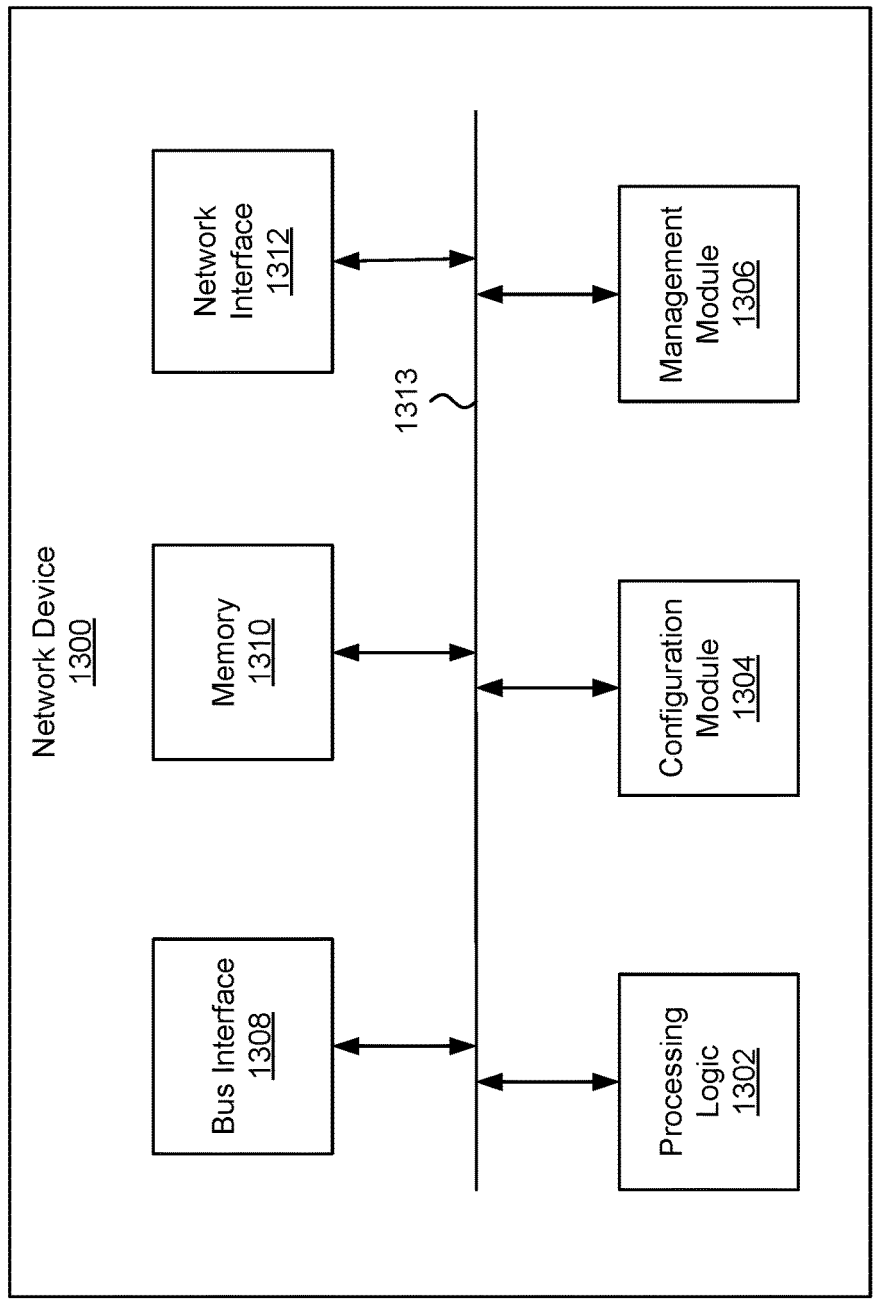
FIG. 13 illustrates an example of a network device, according to certain aspects of the disclosure.

FIG. 13 illustrates an example of a network device 1300. Functionality and/or several components of the network device 1300 may be used without limitation with other embodiments disclosed elsewhere in this disclosure, without limitations. A network device 1300 may facilitate processing of packets and/or forwarding of packets from the network device 1300 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1300 may be the recipient and/or generator of packets. In some implementations, the network device 1300 may modify the contents of the packet before forwarding the packet to another device. The network device 1300 may be a peripheral device coupled to another computer device, a switch, a router or any other suitable device enabled for receiving and forwarding packets.

In one example, the network device 1300 may include processing logic 1302, a configuration module 1304, a management module 1306, a bus interface module 1308, memory 1310, and a network interface module 1312. These modules may be hardware modules, software modules, or a combination of hardware and software. In certain instances, modules may be interchangeably used with components or engines, without deviating from the scope of the disclosure. The network device 1300 may include additional modules, not illustrated here, such as components discussed with respect to the nodes disclosed in FIG. 14. In some implementations, the network device 1300 may include fewer modules. In some implementations, one or more of the modules may be combined into one module. One or more of the modules may be in communication with each other over a communication channel 1314. The communication channel 1314 may include one or more busses, meshes, matrices, fabrics, a combination of these communication channels, or some other suitable communication channel.

The processing logic 1302 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1302 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1302 may be stored on a computer-readable storage medium, for example, in the form of a computer program. The computer-readable storage medium may be non-transitory. In some cases, the computer-readable medium may be part of the memory 1310.

The memory 1310 may include either volatile or non-volatile, or both volatile and non-volatile types of memory. The memory 1310 may, for example, include random access memory (RAM), read only memory (ROM), Electrically Erasable Programmable Read-Only Memory (EEPROM), flash memory, and/or some other suitable storage media. In some cases, some or all of the memory 1310 may be internal to the network device 1300, while in other cases some or all of the memory may be external to the network device 1300. The memory 1310 may store an operating system comprising executable instructions that, when executed by the processing logic 1302, provides the execution environment for executing instructions providing networking functionality for the network device 1300. The memory may also store and maintain several data structures and routing tables for facilitating the functionality of the network device 1300.

In some implementations, the configuration module 1304 may include one or more configuration registers. Configuration registers may control the operations of the network device 1300. In some implementations, one or more bits in the configuration register can represent certain capabilities of the network device 1300. Configuration registers may be programmed by instructions executing in the processing logic 1302, and/or by an external entity, such as a host device, an operating system executing on a host device, and/or a remote device. The configuration module 1304 may further include hardware and/or software that control the operations of the network device 1300.

In some implementations, the management module 1306 may be configured to manage different components of the network device 1300. In some cases, the management module 1306 may configure one or more bits in one or more configuration registers at power up, to enable or disable certain capabilities of the network device 1300. In certain implementations, the management module 1306 may use processing resources from the processing logic 1302. In other implementations, the management module 1306 may have processing logic similar to the processing logic 1302, but segmented away or implemented on a different power plane than the processing logic 1302.

The bus interface module 1308 may enable communication with external entities, such as a host device and/or other components in a computing system, over an external communication medium. The bus interface module 1308 may include a physical interface for connecting to a cable, socket, port, or other connection to the external communication medium. The bus interface module 1308 may further include hardware and/or software to manage incoming and outgoing transactions. The bus interface module 1308 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1308 may include the physical layer for any of these bus protocols, including a connector, power management, and error handling, among other things. In some implementations, the network device 1300 may include multiple bus interface modules for communicating with multiple external entities. These multiple bus interface modules may implement the same local bus protocol, different local bus protocols, or a combination of the same and different bus protocols.

The network interface module 1312 may include hardware and/or software for communicating with a network. This network interface module 1312 may, for example, include physical connectors or physical ports for wired connection to a network, and/or antennas for wireless communication to a network. The network interface module 1312 may further include hardware and/or software configured to implement a network protocol stack. The network interface module 1312 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1300 may include multiple network interface modules, each configured to communicate with a different network. For example, in these implementations, the network device 1300 may include a network interface module for communicating with a wired Ethernet network, a wireless 802.11 network, a cellular network, an Infiniband network, etc.

The various components and modules of the network device 1300, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 14.

Figure 14:
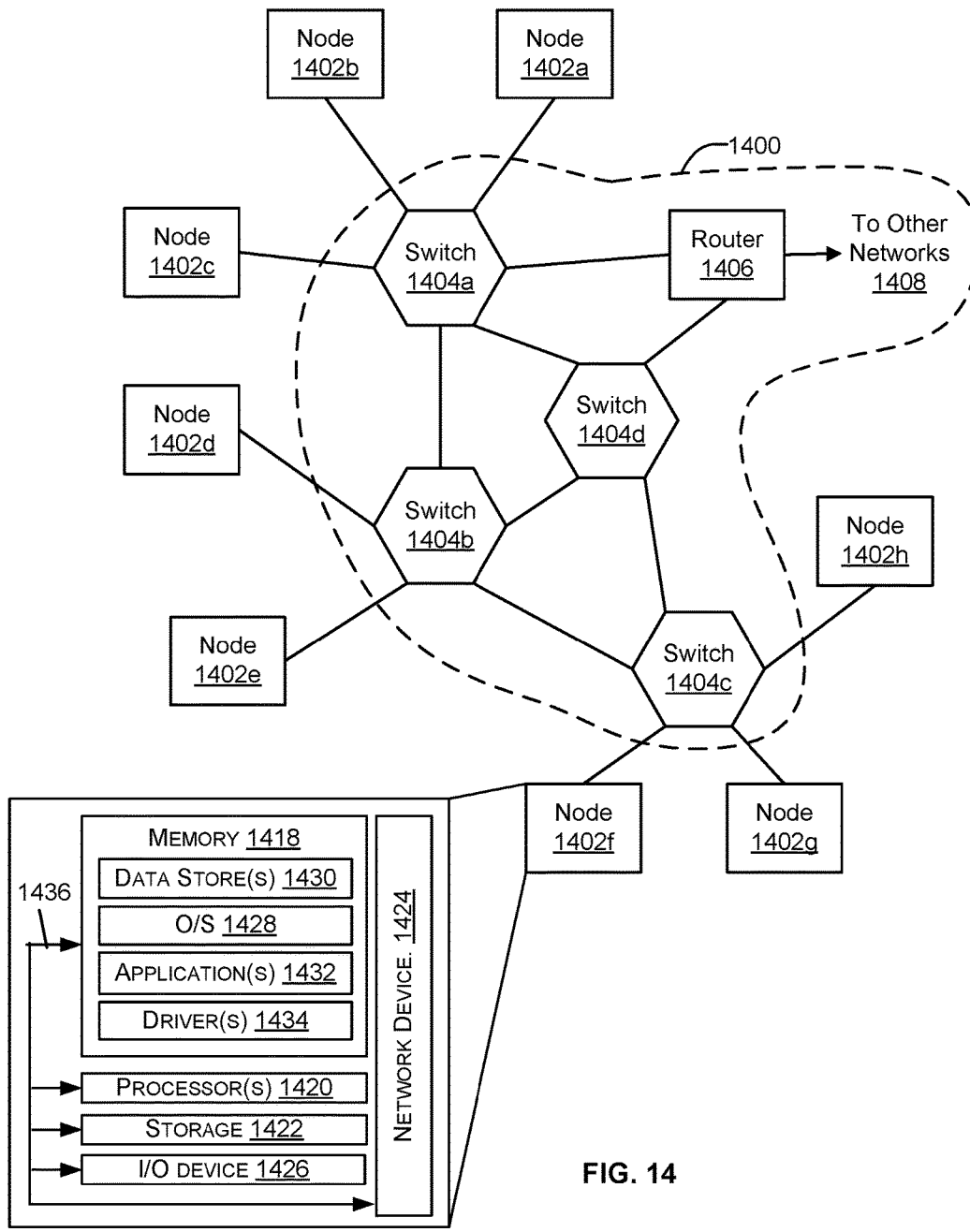
FIG. 14 illustrates an example architecture for features and systems described herein that includes one or more service provider computers and/or a user device connected via one or more networks, according to certain aspects of the disclosure.

FIG. 14 illustrates a network 1400, illustrating various different types of network devices 1300 of FIG. 13, such as nodes comprising the network device, switches and routers. In certain embodiments, the network 1400 may be based on a switched architecture with point-to-point links. As illustrated in FIG. 14, the network 1400 includes a plurality of switches 1404*a*-1404*d*, which may be arranged in a network. In some cases, the switches are arranged in a multi-layered network, such as a Clos network. A network device 1300 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1404*a*-1404*d* may be connected to a plurality of nodes 1402*a*-1402*h* and provide multiple paths between any two nodes.

The network 1400 may also include one or more network devices 1300 for connection with other networks 1408, such as other subnets, LANs, wide area networks (WANs), or the Internet, and may be referred to as routers 1406. Routers use headers and forwarding tables to determine the best path for forwarding the packets, and use protocols such as internet control message protocol (ICMP) to communicate with each other and configure the best route between any two devices.

In some examples, network(s) 1400 may include any one or a combination of many different types of networks, such as cable networks, the Internet, wireless networks, cellular networks and other private and/or public networks. Interconnected switches 1404*a*-1404*d* and router 1406, if present, may be referred to as a switch fabric, a fabric, a network fabric, or simply a network. In the context of a computer network, terms "fabric" and "network" may be used interchangeably herein.

Nodes 1402*a*-1402*h* may be any combination of host systems, processor nodes, storage subsystems, and I/O chassis that represent user devices, service provider computers or third party computers.

User devices may include computing devices to access an application 1432 (e.g., a web browser or mobile device application). In some aspects, the application 1432 may be hosted, managed, and/or provided by a computing resources service or service provider. The application 1432 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1408. Additionally, the user device(s) may be part of the distributed system managed by, controlled by, or otherwise part of the service provider computer(s) (e.g., a console device integrated with the service provider computers).

The node(s) of FIG. 14 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1432 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1402*a*-1402*h* may include at least one memory 1418 and one or more processing units (or processor(s) 1420). The processor(s) 1420 may be implemented in hardware, computer-executable instructions, firmware, or combinations thereof. Computer-executable instruction or firmware implementations of the processor(s) 1420 may include computer-executable or machine-executable instructions written in any suitable programming language to perform the various functions described.

In some instances, the hardware processor(s) 1420 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1418 may store program instructions that are loadable and executable on the processor(s) 1420, as well as data generated during the execution of these programs. Depending on the configuration and type of the node(s) 1402*a*-1402*h*, the memory 1418 may be volatile (such as RAM) and/or non-volatile (such as ROM, flash memory, etc.). The memory 1418 may include an operating system 1428, one or more data stores 1430, one or more application programs 1432, one or more drivers 1434, and/or services for implementing the features disclosed herein.

The operating system 1428 may support nodes 1402*a*-1402*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1428 may also be a proprietary operating system.

The data stores 1430 may include permanent or transitory data used and/or operated on by the operating system 1428, application programs 1432, or drivers 1434. Examples of such data include web pages, video data, audio data, images, user data, and so on. The information in the data stores 1430 may, in some implementations, be provided over the network(s) 1408 to user devices 1404. In some cases, the data stores 1430 may additionally or alternatively include stored application programs and/or drivers. Alternatively or additionally, the data stores 1430 may store standard and/or proprietary software libraries, and/or standard and/or proprietary application user interface (API) libraries. Information stored in the data stores 1430 may be machine-readable object code, source code, interpreted code, or intermediate code.

The drivers 1434 include programs that may provide communication between components in a node. For example, some drivers 1434 may provide communication between the operating system 1428 and additional storage 1422, network device 1424, and/or I/O device 1426. Alternatively or additionally, some drivers 1434 may provide communication between application programs 1432 and the operating system 1428, and/or application programs 1432 and peripheral devices accessible to the service provider computer. In many cases, the drivers 1434 may include drivers that provide well-understood functionality (e.g., printer drivers, display drivers, hard disk drivers, Solid State Device drivers). In other cases, the drivers 1434 may provide proprietary or specialized functionality.

The service provider computer(s) or servers may also include additional storage 1422, which may include removable storage and/or non-removable storage. The additional storage 1422 may include magnetic storage, optical disks, solid state disks, flash memory, and/or tape storage. The additional storage 1422 may be housed in the same chassis as the node(s) 1402a-1402h or may be in an external enclosure. The memory 1418 and/or additional storage 1422 and their associated computer-readable media may provide non-volatile storage of computer-readable instructions, data structures, program modules, and other data for the computing devices. In some implementations, the memory 1418 may include multiple different types of memory, such as SRAM, DRAM, or ROM.

The memory 1418 and the additional storage 1422, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1418 and the additional storage 1422 are examples of computer storage media. Additional types of computer storage media that may be present in the node(s) 1402a-1402h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1402a-1402h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1402a-1402h may also include I/O device(s) 1426, such as a keyboard, a mouse, a pen, a voice input device, a touch input device, a display, speakers, a printer, and the like. The node(s) 1402a-1402h may also include one or more communication channels 1436. A communication channel 1436 may provide a medium over which the various components of the node(s) 1402a-1402h can communicate. The communication channel or channels 1436 may take the form of a bus, a ring, a switching fabric, or a network.

The node(s) 1402a-1402h may also contain network device(s) 1424 that allow the node(s) 1402a-1402h to communicate with a stored database, another computing device or server, user terminals and/or other devices on the network(s) 1400. The network device(s) 1424 of FIG. 14 may include similar components discussed with reference to the network device 1300 of FIG. 13.

In some implementations, the network device 1424 is a peripheral device, such as a PCI-based device. In these implementations, the network device 1424 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1308 may implement NVMe, and the network device 1424 may be connected to a computing system using a PCIe interface.

A PCI-based device may include one or more functions. A "function" describes operations that may be provided by the network device 1424. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1424 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 13, FIG. 14, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device, comprising:
   a plurality of output interface ports;
   a memory storing:
      a plurality of multipath groups, each multipath group associated with respective ones of the output interface ports;
      a plurality of output queues, each output queue corresponding to a respective one of the output interface ports and each output queue storing information indicative of network packets to be output by the network device via the respective output interface port;
      a plurality of congestion control blocks, each congestion control block associated with a respective one of the multipath groups and each congestion control block storing:
         a congested output interface port identifier,
         two identifiers, each associated with a flow of network packets, and
         two counters, each associated with one of the two identifiers;
   congestion control block update logic configured to:
      determine congestion experienced at a particular one of the output queues;
      inspect network packets stored at the particular output queue to determine, for each network packet, a group identifier and a flow of network packets identifier;
      update a congestion control block of the plurality of congest control blocks corresponding to each of the multipath groups associated with the network packets from the particular output queue with flow identification information and network packet count information; and network flow detection logic configured to:
  determine, using the congestion control block for an multipath group, whether a value of a counter of the two counters meets a threshold; and
  upon determining that a counter of the two counters meets the threshold, identify, using an identifier of the two identifiers, a flow of network packets contributing to the congestion experienced at the particular output queue.

2. The network device of claim 1, further comprising:
  congestion avoidance logic configured to, based on the identifying the flow of network packets contributing to the congestion experienced at the particular output queue, route the flow of network packets to an alternate output interface port from an multipath group, an output interface port corresponding to the particular output queue being identified from the plurality of output interface ports as congested based on the congested output interface identifier.

3. The network device of claim 2, wherein the congestion avoidance logic is further configured to change two flows of network packets from being associated with a single output interface port from a multipath group to two separate output interfaces from the multipath group, the two flows of network packets indicated by the two identifiers of the congestion control block associated with the multipath group.

4. The network device of claim 2, wherein the congestion avoidance logic is further configured to:
  modify ranges of hash reference values, wherein each range of hash reference values is associated with selection of an output interface port by one of the multipath groups;
  wherein the flow of network packets identifier includes a hash value; and
  wherein the modifying includes reducing a range of hash reference values associated with an output interface port indicated by the congested output interface identifier to include a hash value associated with a flow of network packets indicated by a first identifier of the two identifiers of a congestion control block associated with the multipath group, and not to include a hash value associated with a flow of network packets indicated by a second identifier of the two identifiers of the congestion control block associated with the multipath group.

5. The network device of claim 1, wherein the congestion control block update logic is further configured to:
  determine a count of network packets stored within the particular output queue over a time period, the network packets each sharing a same flow of network packets identifier and a same group identifier;
  update an identifier of the two identifiers of a congestion control block associated with one of the multipath groups indicated by the group identifier with the same flow of network packets identifier; and
  update a counter of the congestion control block associated with the multipath group indicated by the group identifier with the count.

6. A device, comprising:
  a plurality of output interface ports;
  a memory storing:
    a plurality of multipath groups, each multipath group associated with respective ones of the output interface ports;
    a plurality of output queues, each output queue corresponding to a respective one of the plurality of output interface ports, and each output queue storing information indicative of network packets to be output by the device via the corresponding output interface port;
    a plurality of congestion control blocks, each congestion control block associated with a respective one of the multipath groups and each congestion control block storing statistical information for the associated multipath group;
  congestion control block update logic configured to:
    determine congestion at one of the output queues;
    update the statistical information stored at each congestion control block of the plurality of congestion control blocks with information determined based on network packet information in the congested output queue; and
  network flow detection logic configured to identify, using the congestion control block for a particular one of the multipath groups, a flow of network packets contributing to congestion at the congested output queue.

7. The device of claim 6, wherein the congestion control block logic is configured to determine the congestion based on a number of network packets indicated by information in the output queue.

8. The device of claim 6, further comprising congestion avoidance logic configured to, based on the identifying the flow of network packets contributing to the congestion, route the flow of network packets to an alternate output interface port from the particular multipath group.

9. The device of claim 8, further comprising:
  processing logic configured to generate a hash value based on information associated with a network packet received by the device, wherein the hash value is used to select an output interface port from several output interfaces ports associated with the particular multipath group.

10. The device of claim 9, wherein each output interface port associated with the particular multipath group is associated with a range of reference hash values, the output interface ports selected to route each network packet received by the device being based on a determination of whether the hash value of each network packet received by the device falls within one of the ranges of hash reference values; and
  the device further comprising congestion avoidance logic configured to modify, based on statistical information from the congestion control block for the particular multipath group, a range of hash reference values associated with an output interface port selected by the particular multipath group to route a flow of network packets to an alternate output port by the particular multipath group.

11. The device of claim 6, wherein the device includes at least one of: a processor, microcontroller, system on a chip, field programmable gate array, complex programmable logic device, or digital signal processor.

12. The device of claim 6, wherein the memory comprises sets of output queues, each set of output queues comprising a plurality of output queues, a certain output queue of each plurality of output queues being associated with a certain output interface port of the plurality of output interface ports.

13. The device of claim 6, wherein the congestion control block update logic is further configured to select which congestion control block to update based on a group identifier associated with network packets in the congested output queue.

14. The device of claim 6, wherein the device is configured to store network packets within the plurality of output queues associated, each network packet associated with a group identifier and a flow identifier.

15. The device of claim 14, wherein the statistics information includes two identifiers, each identifier determined based on the identifiers associated with network packets of the congested output queue.

16. The device of claim 15, further comprising congestion avoidance logic configured to, based on the identifying the flow of network packets contributing to the congestion, modify routing one of two flows of network packets identified by the two identifiers of the statistics information, wherein the modifying the routing includes routing the two flows of network packets to two different output interface ports of the plurality of output interface ports.

17. A method, comprising:

receiving a plurality of flows of network packets;

determining, by processing logic of a device, a hash value for each of the network packets of the flows, wherein the hash value indicates the flow of network packets that a network packet belongs to;

selecting, based on the hash value, one of a plurality of interface ports of a multipath group of the device for output of network packets from two of the flows of network packets;

storing, at an output queue of the device, information associated with network packets from the two flows of network packets to be output by the interface port;

determining whether a number of packets stored by identifiers, in the output queue, from one of the two flows of network packets, meets a first threshold; and upon determining that the number of packets stored from the one of the two flows of network packets meets the first threshold, identifying the one of the two flows of network packets as a congestion contributing flow.

18. The method of claim 17, further comprising outputting the congestion contributing flow and the other of the two flows on different interface ports.

19. The method of claim 18, wherein the different interface ports are associated with different output queues.

20. The method of claim 17, wherein the identifying includes identifying the two flows of network packets based on a total number of packets stored via the output queue for a time period.

* * * * *

UNITED STATES PATENT AND TRADEMARK OFFICE
CERTIFICATE OF CORRECTION

| | | |
|---|---|---|
| PATENT NO. | : 10,015,096 B1 | Page 1 of 1 |
| APPLICATION NO. | : 15/187486 | |
| DATED | : July 3, 2018 | |
| INVENTOR(S) | : Bijendra Singh | |

It is certified that error appears in the above-identified patent and that said Letters Patent is hereby corrected as shown below:

In the Claims

Column 24, Line 34, Claim 9:
Delete: "interfaces ports associated with the particular multipath"
Insert: --interface ports associated with the particular multipath--

Signed and Sealed this
Thirtieth Day of July, 2019

Andrei Iancu
*Director of the United States Patent and Trademark Office*